(12) United States Patent
Robinson et al.

(10) Patent No.: US 6,768,822 B1
(45) Date of Patent: Jul. 27, 2004

(54) CHROMATIC DISPERSION COMPENSATION

(75) Inventors: Alan Robinson, Harlow (GB); Julian A. Fells, Epping (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/560,628

(22) Filed: Apr. 28, 2000

(51) Int. Cl.[7] ............................. G02B 6/34; G02B 6/16; H04B 10/18

(52) U.S. Cl. ............................ 385/10; 385/37; 385/123; 398/147; 398/148

(58) Field of Search ............................. 385/10, 15, 24, 385/37, 122, 123; 398/147–150; 359/161

(56) References Cited

U.S. PATENT DOCUMENTS

| | | | | |
|---|---|---|---|---|
| 5,877,881 A | * | 3/1999 | Miyauchi et al. | 398/193 |
| 6,295,396 B1 | * | 9/2001 | Cao et al. | 385/24 |
| 6,317,539 B1 | * | 11/2001 | Loh et al. | 385/37 |
| 6,396,987 B1 | * | 5/2002 | de Montmorillon et al. | 385/123 |
| 6,486,993 B1 | * | 11/2002 | Kuroshima | 359/161 |
| 6,498,669 B1 | * | 12/2002 | Payne et al. | 398/147 |
| 6,619,867 B1 | * | 9/2003 | Asahi | 398/154 |
| 2001/0048788 A1 | * | 12/2001 | Xie et al. | 385/37 |
| 2002/0159699 A1 | * | 10/2002 | Kohnke et al. | 385/39 |
| 2003/0021532 A1 | * | 1/2003 | Painchaud | 385/37 |
| 2003/0035625 A1 | * | 2/2003 | Riant et al. | 385/37 |
| 2003/0063884 A1 | * | 4/2003 | Smith et al. | 385/129 |

OTHER PUBLICATIONS

Tsuda, "Second–And Third–Order Dispersion Compensation Using A High Resolution Arrayed–Waveguide Grating", ECOC '98, Sep. 20–24, 1998, pp. 533–534.

Williams, "Fiber Bragg Grating Fabrication for Dispersion Slope Compensation", IEEE Photonics Technology Letters, vol. 8, No. 9, 9/96, pp. 1187–1189.

Faibert, "Optimised dispersion management scheme for long–haul optical communication systems", Electronics Letters, vol. 35, No. 21, Oct. 14, 1999, 2 pages.

Knight, "All–silica single–mode optical fiber with photonic crystal cladding", Optics Letters, vol. 21, No. 19, Oct. 1, 1996, pp. 1547–1549.

Poole, "Optical Fiber–Based Dispersion Compensation Using Higher Order Modes Near Cutoff", IEEE Journal of Lightwave Technology, vol. 12, No. 10, 10/94, pp. 1746–1758.

* cited by examiner

*Primary Examiner*—John D. Lee
(74) *Attorney, Agent, or Firm*—Barnes & Thornburg LLP (57) ABSTRACT

An optical dispersion compensation device includes a first optical compensation unit that applies non-linear dispersion compensation across a signal band, the first optical compensation unit being coupled to a second optical compensation unit that applies a degree of linear dispersion compensation across the signal band. The approach taken is to provide broadband dispersion compensation by applying dispersion slope compensation across the signal band to equalise residual dispersion slope and by applying a degree of linear compensation separately to affect the required linear dispersion compensation. Using these two degrees of freedom it is possible to set the desired dispersion slope and linear dispersion (whether positive or negative) to affect broadband dispersion compensation without needing to demultiplex the optical signal.

32 Claims, 6 Drawing Sheets

CHROMATIC DISPERSION COMPENSATION

FIELD OF THE INVENTION

This invention relates to the compensation of chromatic dispersion, hereinafter referred to as dispersion, in optical transmission systems.

Linear (first order) dispersion, D, is the measure of the rate of change of group delay, τ, with wavelength, λ. Linear dispersion is typically measured in picoseconds per nanometre (ps/nm). In the case of a transmission medium, for instance an optical fibre waveguide, whose waveguiding properties are uniform along its length, the linear dispersion exhibited by the medium is proportional to its length and so, for such a medium, it is convenient to define its linear dispersion per unit length, also known as its linear dispersion power. This is typically measured in picoseconds per nanometre per kilometer (ps/nm/km).

The value of the linear dispersion of a transmission path is generally itself a function of wavelength, and so there is a quadratic (second order) dispersion term, Q, also known as dispersion slope, which is a measure of the rate of change of linear dispersion with wavelength. This is typically measured in picoseconds per nanometre squared (ps/nm$^2$).

BACKGROUND TO THE INVENTION

In a digital transmission system the presence of dispersion leads to pulse broadening, and hence to a curtailment of system reach before some form of pulse regeneration becomes necessary. The problem presented by dispersion increases rapidly with increasing bit rate. This is because, on the one hand, increasing the bit rate produces increased spectral broadening of the pulses, and hence increased dispersion mediated pulse broadening; while on the other hand, increasing the bit rate also produces a reduction in the time interval between consecutive bits. In a WDM (wavelength division multiplexed) digital transmission system, it is not practical to minimise the problems of dispersion by choosing to employ a transmission medium exhibiting near-zero first order dispersive power because low first order dispersive power is associated with aggravated non-linear (e.g. four-wave mixing) distortion. A known solution to this problem is to employ 'managed dispersion' in which near-zero aggregate linear dispersion over a particular transmission path is achieved by the use of alternating sections respectively exhibiting positive linear dispersion and negative linear dispersion, for instance by the use of NDS and DC optical fibre waveguide.

Having regard to the manufacturing tolerances in practice encountered in the fabrication of NDS and DC fibre, achieving adequately low aggregate linear dispersion becomes increasingly difficult as the bit rate is increased. Consider for instance a 40 Gbit/s WDM transmission system with a reach of 400 km, and with the shortest and longest wavelength channels separated by 200 nm. The actual amount of linear dispersion in any particular channel that can be tolerated at the receiver will of course be dependent upon a number of system parameters, but typically may lie in the region of 100 ps/nm. A typical NDS fibre exhibits, at a wavelength of 1550 nm, a linear dispersive power of approximately 17 ps/(nmkm), and a quadratic dispersive power of approximately 0.058 ps/(nm$^2$km). Currently DC fibre is fabricated to a tolerance of ±20% in respect of quadratic dispersive power. Therefore, for the 400 km span length, the uncertainty in linear dispersion compensation at the 1550 nm wavelength will amount to approximately 400 ps/nm (400×17×0.06 ps/nm).

Given the 200 nm wavelength range, the additional uncertainty at the wavelength extremities produced by the ±20% quadratic tolerance amounts approximately to a further 900 ps/nm (400×0.058×200×0.2 ps/nm). To this must be added any uncertainty arising from any imprecision in the knowledge of the length and dispersion of the transmission fibre.

The foregoing indicates that, even if the DC fibre were manufactured to tolerances tightened by an order of magnitude, those tolerances would still be large enough to cause difficulty in achieving an accurate enough compensation for the reliable provision of an operating point near the centre of the 100 ps/nm window.

Additionally, in ultra long haul optical transmission systems (<3000 km) at 10 GBit/s or more, it is necessary to use high optical powers in the fibre in order to achieve sufficient signal to noise ratio at the receiver, A consequence of these high optical powers is that the nonlinear interactions caused by cross-phase modulation (XPM) and self-phase modulation are significantly enhanced. These two nonlinear mechanisms interact with chromatic dispersion to distort the pulse shape and cause timing jitter of the optical pulses. Whereas in a linear system it is possible to lump all the dispersion compensation in one place (e.g. at the receiver), in a nonlinear system, the distribution of the dispersion compensation can be critical. In particular it is necessary to control the net dispersion immediately following an optical amplifier, where the optical powers and hence nonlinearity are strongest. Simulations have shown the dispersion uncertainty at each amplifier site typically must be within 500 ps/nm, which is the equivalent 30 RM of NDS fibre.

SUMMARY OF THE INVENTION

According to a first aspect of the present invention, an optical dispersion compensation device comprises a first optical compensation unit that applies non-linear dispersion compensation across a signal band, the first optical compensation unit being coupled to a second optical compensation unit that applies a degree of linear dispersion compensation across the signal band.

According to a second aspect of the present invention, a method of providing dispersion compensation comprises the steps of passing an optical signal through a first optical compensation unit which applies non-linear dispersion compensation across a signal band, and also passing the optical signal through a second optical compensation unit, coupled to the first optical compensation unit, which applies a degree of linear dispersion compensation across the signal band.

The approach taken in the present invention is to provide broadband dispersion compensation by applying dispersion slope compensation across the signal band to equalise residual dispersion slope and by applying a degree of linear compensation separately to affect the required linear dispersion compensation. Using these two degrees of freedom it is possible to set the desired dispersion slope and linear dispersion (whether positive or negative) to affect broadband dispersion compensation. Importantly, it is not necessary to demultiplex the optical signal.

In a preferred embodiment, the first optical compensation unit comprises an array of non-linearly chirped fibre gratings, each having a different dispersion slope, and an optical switch for selectively coupling one of the chirped fibre gratings into an optical path. Likewise, the second optical compensation unit comprises an array of linearly chirped fibre gratings, each offering a different degree of linear dispersion, and an optical switch for selectively coupling one of the linearly chirped fibre gratings into an optical path.

It is preferred that the chirped fibre gratings in the first optical compensation unit each have a relatively high dispersion slope with relatively low linear dispersion. Furthermore, the respective dispersion slopes in the array of chirped fibre gratings are centred about a pivotal point positioned substantially at the centre of the signal band.

In the preferred embodiment, a four port optical circulator is used to couple light between the first optical compensation unit and the second optical compensation unit, wherein one port is coupled to the first optical compensation unit and an adjacent port is coupled to the second optical compensation unit. The remaining ports of the optical circulator are coupled to a respective one of an optical input and an optical output of the optical dispersion compensation device.

Dispersion compensation components within the first and second optical compensation units can be arranged either to be reflected or transmissive, according to requirements.

BRIEF DESCRIPTION OF THE DRAWINGS

Examples of the present invention will now be described in detail with reference to the accompanying drawings, in which.

DETAILED DESCRIPTION

Figure 1:
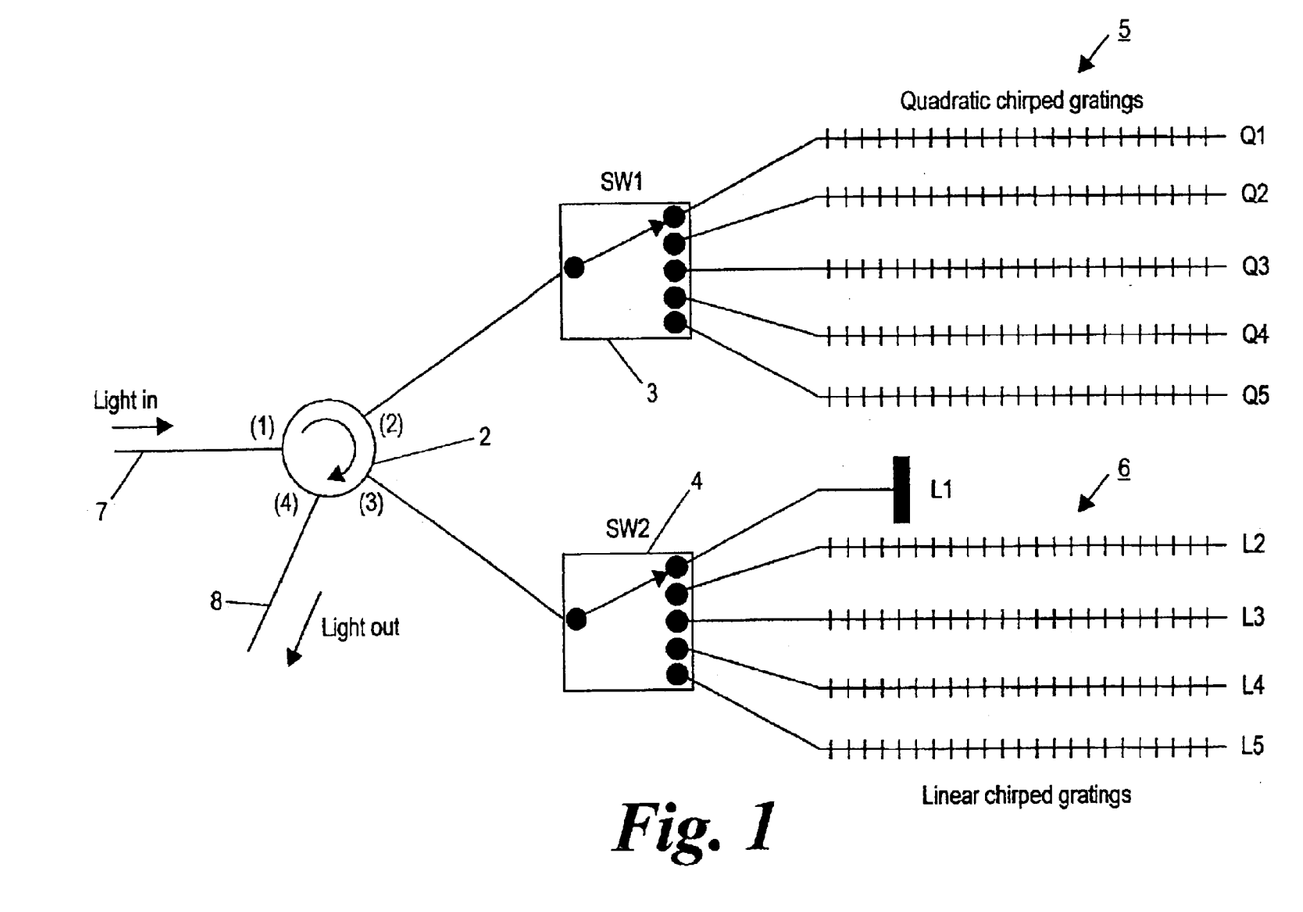
FIG. 1 shows a first example of an optical dispersion compensation device in accordance with the present invention.

FIG. 1 shows an example of an optical dispersion compensation device 1 having a four-port optical circulator 2, two optical switches 3 and 4, and two arrays of fibre gratings 5 and 6. Light from an optical input 7 enters port (1) of the circulator 2 and is directed onto the first optical switch 3 on port (2). Depending on the switch state of the optical switch 3, light is reflected by one of the fibre gratings Q1 to Q5 in the first array. Reflected light re-enters the circulator at port (2) and is directed onto the second optical switch 4 on port (3). Depending on the switch state of the optical switch 4, light is reflected by one of the fibre gratings L1 to L5 in the second array (in this example L1 is a mirror). Reflected light re-enters the circulator 2 at port (3) and is finally transmitted to an optical output 8 via port (4).

Figure 2:
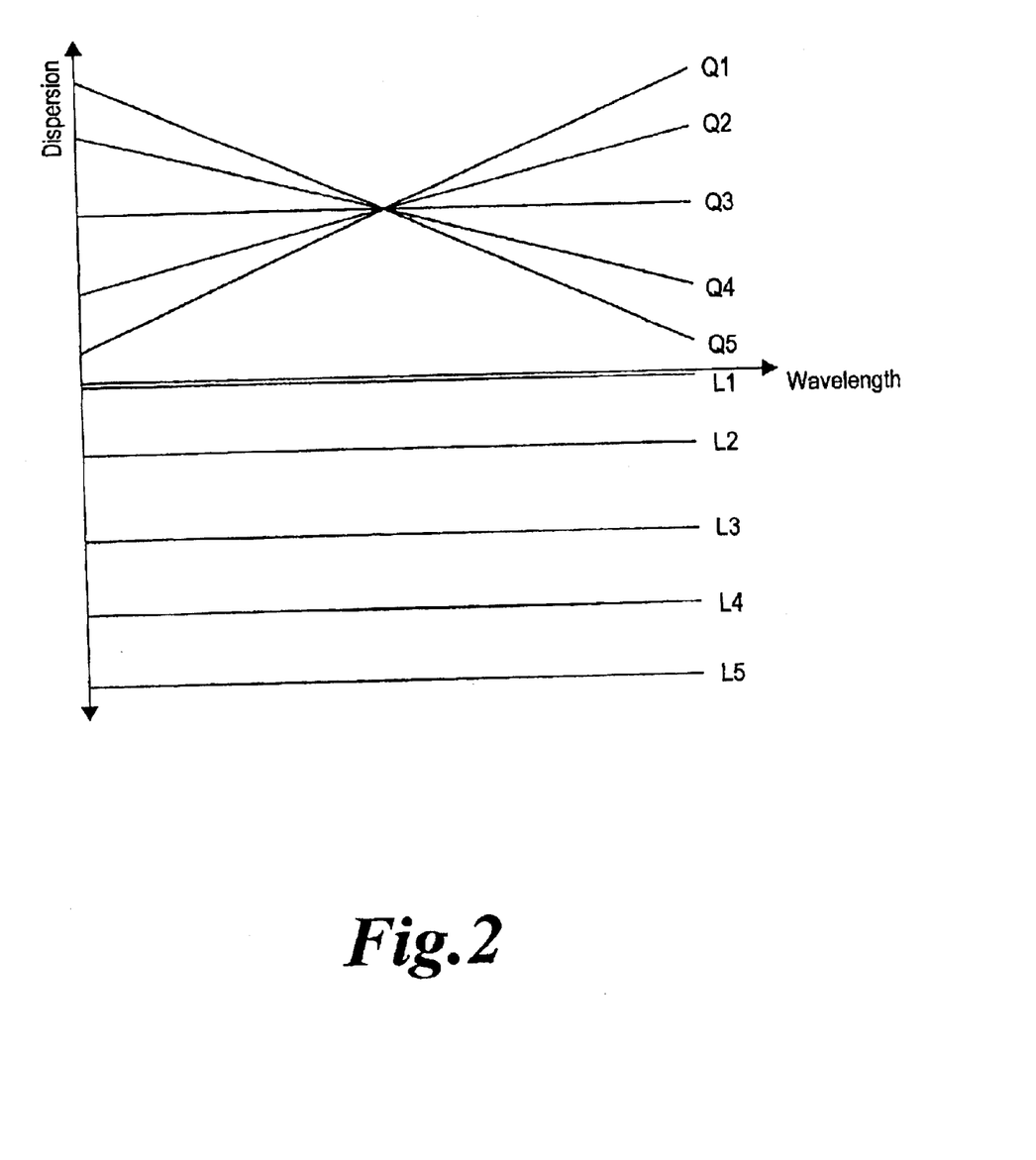
FIG. 2 shows the optical characteristics of chirped fibre gratings in the device of FIG. 1.

The fibre (Bragg) gratings Q1 to Q5 in the first array 5 are non-linearly (substantially quadratically) chirped to give the dispersions indicated in FIG. 2. The first optical switch 3 is used to select the grating Q1 to Q5 that has a dispersion slope that most closely matches the net dispersion slope at the position of the device 1 in the network. The second optical switch 4 is then used to select a linear fibre (Bragg) grating L1 to L5 in the second array 6 to set the desired net dispersion at the position of the device (generally this will be slightly positive). Using these two degrees of freedom it is possible to set any desired dispersion slope and linear dispersion (positive or negative) to within the granularity of the two arrays 5 and 6.

As shown in FIG. 2, the quadratic chirped gratings Q1 to Q5 introduce positive dispersion about a pivotal point in the centre of the band. The linear chirped gratings L1 to L5 introduce constant negative dispersion across the band.

Figure 3A:
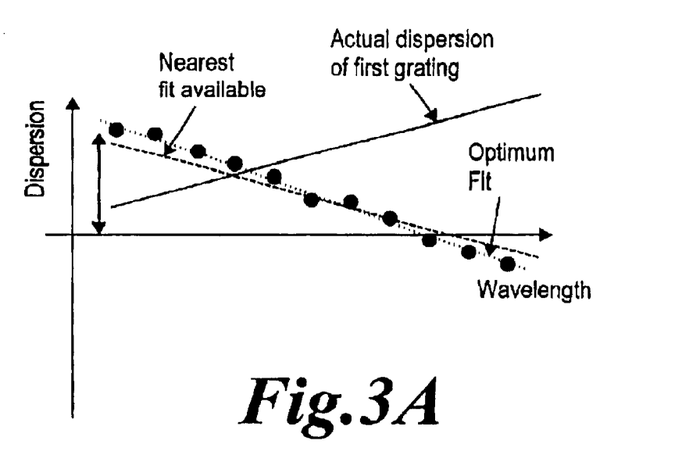
FIGS. 3A to 3C show the effect of passing a chromatically dispersed signal through the device of FIG. 1.
Figure 3B:
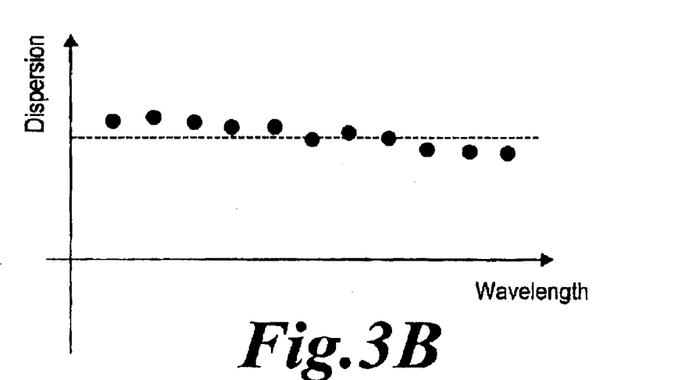
Figure 3C:
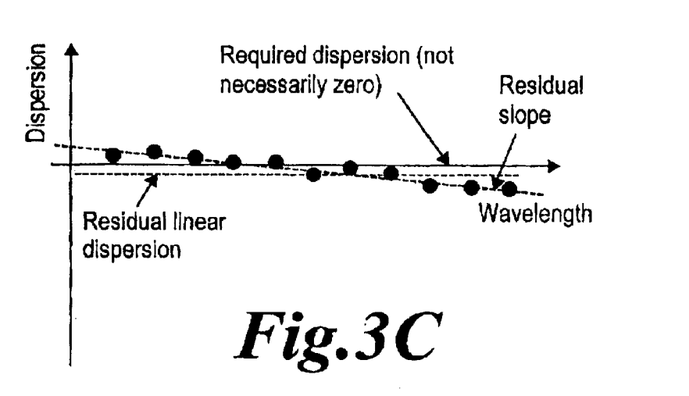

FIGS. 3A to 3C illustrate the chromatic dispersion compensation affected by passing an uncompensated signal (FIG. 3A) through the first array 5 (FIG. 3B) and subsequently the second array 6 (FIG. 3C).

An example design would have a maximum dispersion slope term for Q1 of 12 ps/nm$^2$, and a linear dispersion of 20 ps/nm at the lowest end. Grating Q2 would have a 6 ps/nm$^2$ dispersion slope and linear dispersion of 135 ps/nm at the lowest end. Grating Q3 would have zero dispersion slope and a constant linear dispersion of 238 ps/nm. Grating Q4 would have a dispersion slope of −6 ps/nm$^2$ and a linear dispersion of 135 ps/nm at the lowest dispersion end. Grating Q5 would have a dispersion slope of −12 ps/nm$^2$, and a linear dispersion of 20 ps/nm at the lowest dispersion end. Although five gratings Q1 and Q5 are shown in the first array 5, a larger number could be used to provide intermediate dispersion slope values. The linear chirped gratings L1 to L5 in the second array 6 in this example have constant negative dispersions of 0 (a mirror), 119, 238, 357 and 476 ps/nm, respectively.

A fabrication process for broadband chirped fibre Bragg gratings which can be used to compensate for dispersion slope is disclosed in a paper: J A R Williams, L A Everall, I Bennion and N J Doran, "Fiber Bragg Grating Fabrication for Dispersion Slope Compensation", IEEE Photonics Technology Letters, Vol 8, No 9, September 1996.

Instead of using broadband fibre gratings, dispersion compensation could be achieved by an array of single channel fibre gratings i.e., a separate grating for each wavelength. These gratings would be physically separated in the fibre and also spectrally separated with guard bands. Whilst this arrangement would require temperature drift compensation (either by mechanical design or temperature control), it affords two advantages:

(i) Single channel gratings typically have much less group delay ripple than long gratings, resulting in better performance; and, (ii) The order of the gratings on the fibre can be reversed, such that the shortest wavelength channel is closest to the circulator. This avoids a problem known as "short wavelength loss", whereby light at a shorter wavelength to the Bragg wavelength suffers a loss in transmission through out-coupling into cladding modes.

If individual gratings are used for the quadratic compensation component then they could all be linearly chirped, but with an increasing (or decreasing) amount of dispersion. This would make the gratings much simpler to fabricate. Equally the gratings could have a quadratic dispersion component as well to equalise the effect of quadratic dispersion within the signal bandwidth, which may be important at higher bit rates than 40 GBit/s.

It is possible to extend the hierarchy of this arrangement by having more ports in the optical circulator 2 coupled to grating arrays (not shown) offering cubic, quartic and higher dispersion terms in order to tailor the dispersion more closely to the actual fibre dispersion profile. This may be required if ELEAF (enhanged large effective area fibres) is used as the dispersion zero is close to the signal band and it suffers a significant slope on the dispersion slope.

Instead of chirped fibre gratings, the dispersion compensating component can be:

(i) A Bragg grating (fibre or planar waveguide type) in reflection;

(ii) A Bragg grating (fibre or planar waveguide type) in transmission (the grating couples light between two modes with different propagation constants). It is chirped such that different wavelengths of light spend different proportions of their transmission path between the two modes;

(iii) Dispersion Compensating fibre in transmission (or in reflection if a mirror is used);

(iv) Photonic crystal device (fibre or planar waveguide type) in transmission (or reflection if used with a mirror). Photonic crystal fiber can be formed from an array of capillaries, rather than a simple pre-form. The resultant fibre has a periodic array of 'air holes' or defects in its cross section, which allow guiding of light. [Reference: J C Knight, T A Birks, P St J Russell and DM Atkin, "All-silica single-mode optical fiber with photonic crystal cladding", Optics Letters, Vol 21, No 19, pp 1547–1549, 1996]. More generally the guidance properties of photonic crystal waveguides can be modified by arrays of holes, and/or slits, and/or by arrays of regions with different refractive index to the surrounding core or cladding material.

(v) Higher order mode fibre. Light is launched into a higher order spatial mode of the fibre, which exhibits high wavelength dispersion. A mode converter is required to convert between the fundamental mode and the higher order mode and back again. This mode converter could be bulk optics or a fibre grating. Higher order mode compensators (fibre+mode-converter) are currently being fabricated by Lasercomm Inc (http://www.lasercomm-inc.com). [Reference: C D Poole, J M Wiesenfield, D J DiDiovanni and A M Vengsarker, "Optical Fibre-Based Dispersion Compensation Using Higher Order Modes Near Cutoff", Journal of Lightwave Technology, Vol 12, No 10, pp 1746–1758, 1994].

(vi) Planar waveguide component such as a Cascaded Mach-Zehnder [Reference: K Takiguchi, K Okamoto and K Moriwaki, "Planar Lightwave Circuit Dispersion Equalizer", Journal of Lightwave Technology, Vol 14, No 9, pp 2003–2011, 1996, or arrayed waveguide device [Reference: H Tsuda, T Kurokawa, K Okamoto, T Ishii, K Naganuma, Y Inoue and H Takenouchi, "Second and third-order dispersion compensation using a high resolution arrayed waveguide grating", Proceedings ECOC'98 Madrid, pp 533–534, 1998].

(vii) Etalon based filter [Reference: U.S. Pat. No. 5,557,468].

Instead of using optical switches, it is possible to provide optical connectors (not shown) on ports (2) and (3) of the optical circulator 2. An engineer could then select the most appropriate pair of gratings from the two arrays 5 and 6 and connect them to the circulator 2.

Figure 4:
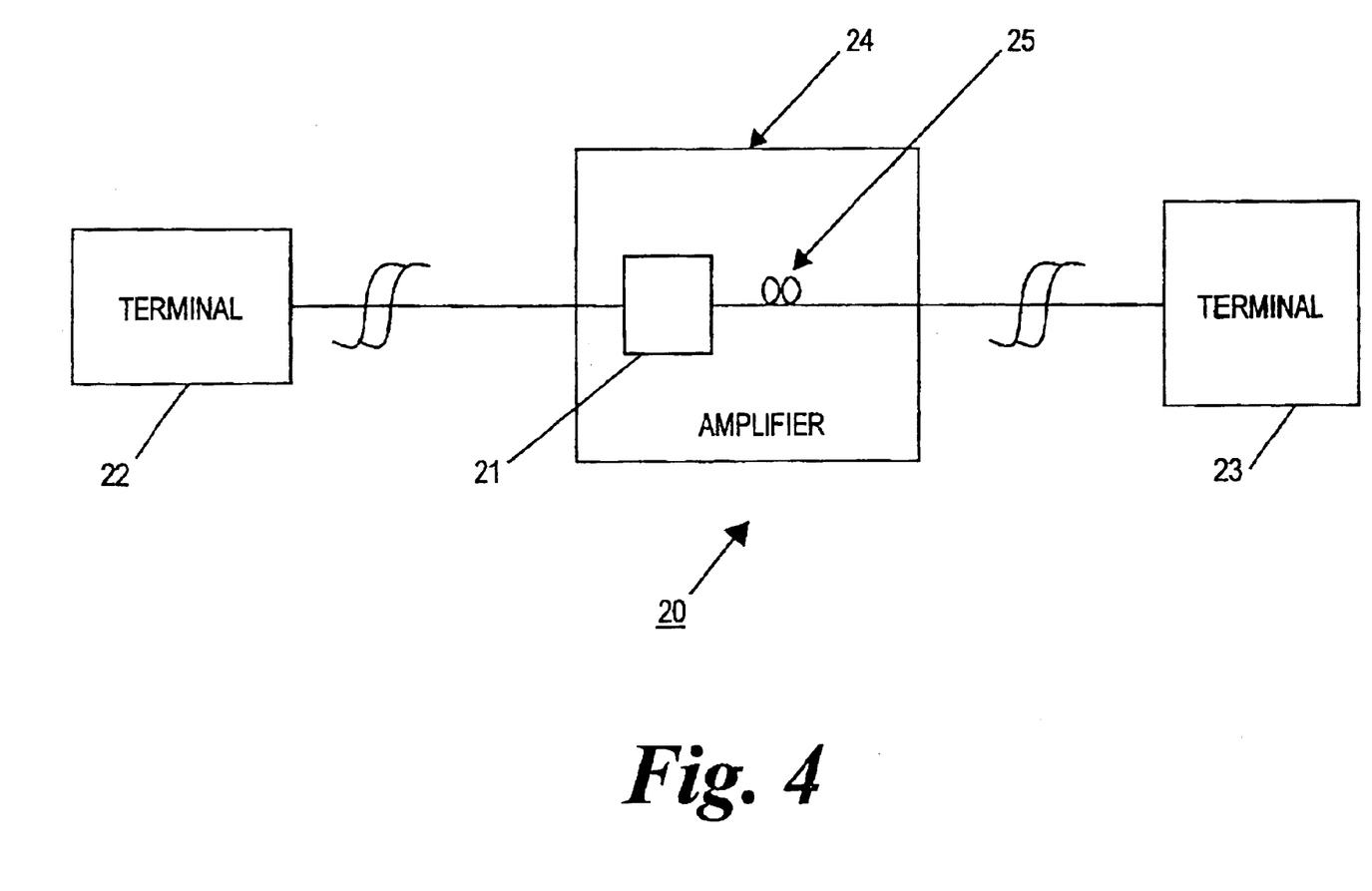
FIG. 4 shows schematically an optical communications network having an optical dispersion compensation device in accordance with the present invention.

An example of an optical communications network 20 is illustrated schematically in FIG. 4. A chromatic dispersion compensation device 21 is positioned between two remote terminals 22 and 23 in the optical network 20, usually as part of an optical amplifier device 24 used to restore signal power for onward transmission of the optical signal. In this example, the dispersion compensation device 21 is coupled to an erbium doped fibre amplifier 25 and an appropriate pair of gratings in the two arrays (not shown) selected to most closely match the dispersion profile at the position of the device in the network.

Figure 5:
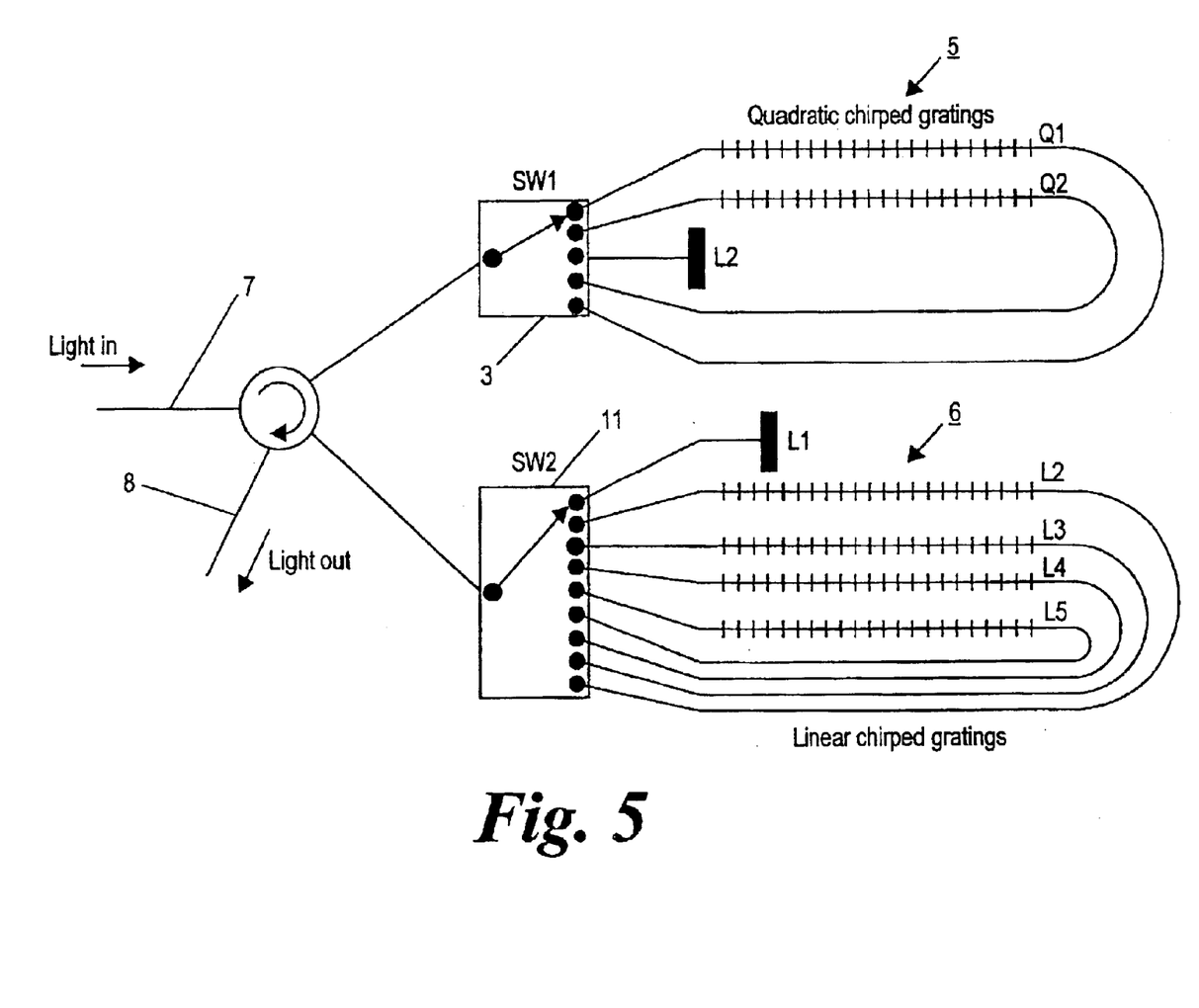
FIG. 5 shows a second example of an optical dispersion compensation device; and, FIG. 6 shows a third example of an optical dispersion compensation device.

Another example of a dispersion compensation device 10 is shown in FIG. 5. In this example, both ends of each quadratic grating Q1 to Q3 in the first array 5 are used, thereby reducing the number of gratings in the array (the first optical switch 3 must be provided with adequate anti-reflection coatings). However, this design requires more ports in the second optical switch 11 because now the linear offset introduced by the quadratic gratings Q1 to Q3 could be positive or negative, depending on the particular optical transmission path selected by the first optical switch 3. The sign of the linear offset is adjusted by using an appropriate end of a selected one of the linear grating L2 to L5.

Figure 6:
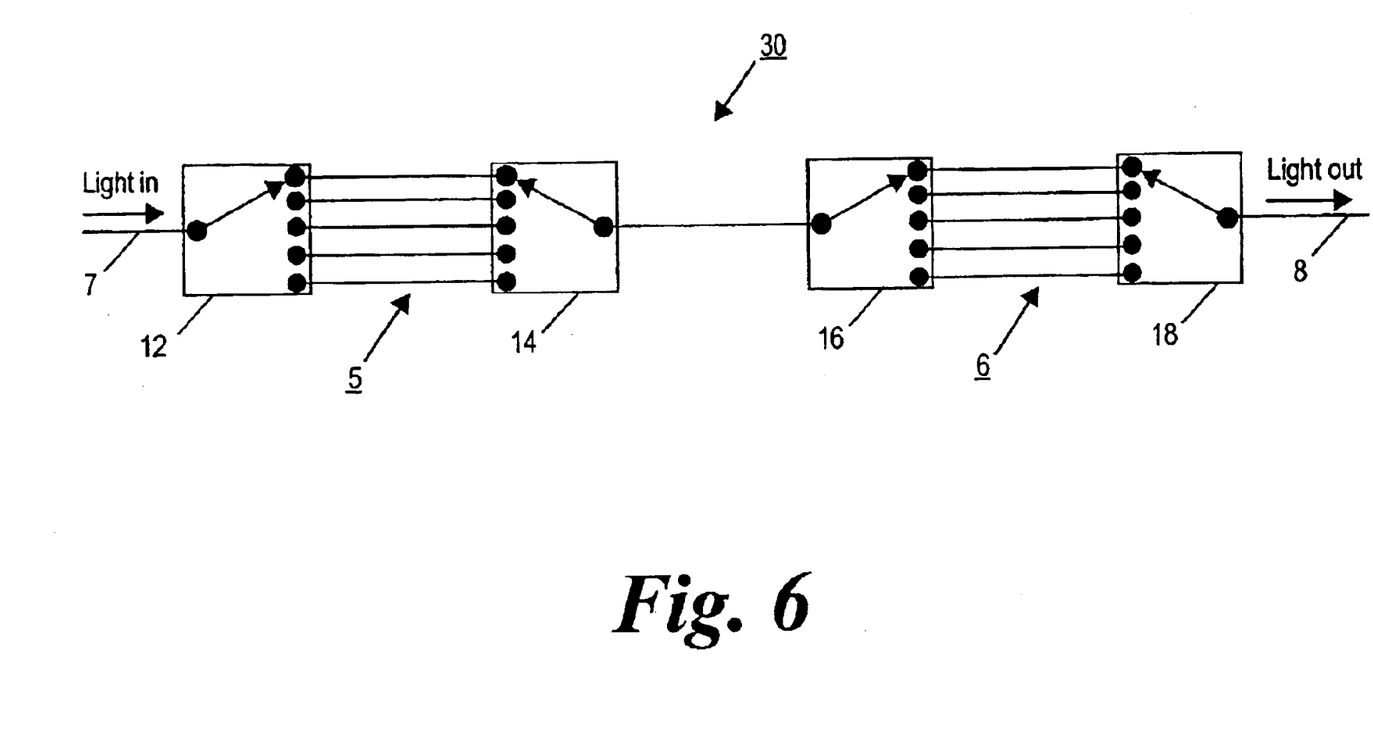

A further example of a dispersion compensation device is shown in FIG. 6. In this example, the device 30 is configured in transmission and uses lengths of dispersion compensating fibre (for example photonic crystal fibre) with tailored dispersion characteristics in the first and second arrays 5 and 6, respectively. The selection of the most appropriate fibres is made by selecting the switch state of the optical switches 12, 14, 16 and 18. Again, other dispersion compensating components could be used instead. The hierarchy can of course be extended to multiple parallel and serial combinations.

We claim:

1. An optical dispersion compensation device comprising a first optical compensation unit which applies chromatic dispersion which varies with wavelength across a signal band, the first optical compensation unit being coupled to a second optical compensation unit which applies chromatic dispersion which does not vary with wavelength across the signal band.

2. A device according to claim 1, in which the first optical compensation unit comprises a number of chirped Bragg gratings.

3. A device according to claim 2, in which the or each Bragg grating is reflective.

4. A device according to claim 2, in which the or each Bragg grating is transmissive.

5. A device according to claim 1, in which the first optical compensation unit comprises an array of broadband chirped Bran gratings, each having a different dispersion slope, and an optical device for selectively coupling one of the chirped Bragg gratings into an optical path.

6. A device according to claim 5, in which the respective dispersion slopes in the array of chirped Bragg gratings are centred about a pivotal point positioned substantially at the center of the signal band.

7. An optical communications network comprising a dispersion compensation device according to a selected one of claims 1 to 6.

8. A device according to claim 2 or 5, in which the or each chirped Bragg grating has a relatively high dispersion slope with relatively low linear dispersion.

9. A device according to claim 2 or 5, in which the or each chirped Bragg grating is a quadratic chirped grating.

10. A device according to claim 1, in which the first optical compensation unit comprises an array of dispersion paths, each offering a different dispersion slope, and an optical device for selecting one of the dispersion paths, wherein each dispersion path comprises a number of chirped Bragg grating.

11. A device according to claim 10, in which each dispersion path comprises a single broadband chirped Bragg grating.

12. A device according to claim 10, in which each dispersion path comprises a series of narrowband Bragg gratings, each grating being tuned to a different wavelength.

13. A device according to claim 12, in which the Bragg gratings are all linearly chirped, with each grating offering a different amount of dispersion.

14. A device according to claim 1, in which the second optical compensation unit comprises a number of linearly chirped Bragg gratings.

15. A device according to claim 14, in which the or each linearly chirped Bragg grating introduces a degree of dispersion which does not very with wavelength.

16. A device according to claim 14, in which the or each Bragg grating is reflective.

17. A device according to claim 14, in which the or each Bragg grating is transmissive.

18. A device according to claim 1, in which the second optical compensation unit comprises an array of linearly chirped Bragg gratings, each offering a different degree of dispersion which does not vary with wavelength, and an optical switch for selectively coupling one of the linearly chirped Bragg gratings into an optical path.

19. A device according to claim 1, comprising one or more optical circulators which couple light between the first optical compensation unit and the second optical compensation unit.

20. A device according to claim 19, comprising a four port optical circulator, wherein one port is coupled to the first optical compensation unit and an adjacent port is coupled to the second optical compensation unit.

21. A device according to claim 20, in which the remaining two ports of the four port optical circulator are coupled to a respective one of an optical input and an optical output of the optical dispersion compensation device.

22. A device according to claim 1, in which the first optical compensation unit comprises a number dispersion waveguides, with tailored dispersion characteristics.

23. A device according to claim 22, in which each dispersion waveguide is a photonic crystal device.

24. A device according to claim 22, in which each dispersion waveguide operates in a higher order mode.

25. A method of providing dispersion compensation comprising the steps of passing an optical signal through a first optical compensation unit which applies chromatic dispersion which varies with wavelength across a signal band, and also passing the optical signal through a second optical compensation unit, coupled to the first optical compensation unit, which applies chromatic dispersion which does not vary with wavelength across the signal band.

26. A method according to claim 25, in which the dispersion which varies with wavelength is effected by passing the optical signal through a non-linear chirped Bragg grating having a predetermined dispersion slope.

27. A method according to claim 25, in which the dispersion which does not vary with wavelength is effected by passing the optical signal through a linearly Bragg grating offering a predetermined degree of linear dispersion.

28. A method according to claim 25, in which at least one of the first optical compensation unit and the second optical compensation unit comprises an array of Bragg gratings for effecting dispersion and an optical switch, wherein the optical signal is selectively coupled to a desired Bragg grating by setting switch state of the optical switch.

29. A method according to claim 25, in which light is coupled between the first optical compensation unit and the second optical compensation unit using an optical circulator.

30. A method according to claim 25, in which the first optical compensation unit applies dispersion which varies with wavelength across the signal band to equalize residual dispersion slope and the second optical compensation unit applies a degree of dispersion which does not vary with wavelength to effect linear dispersion compensation, thereby providing broadband dispersion compensation across the signal band.

31. An optical dispersion compensation device comprising a first optical compensation unit which applies chromatic dispersion which varies with wavelength across a signal band, the first optical compensation unit comprising an array of dispersion path each offering a different dispersion slope, and an optical device for selecting one of the dispersion paths.

32. A device according to claim 31, in which the first optical compensation unit is coupled to a second optical compensation unit which applies chromatic dispersion which does not vary with wavelength across the signal band.

* * * * *